United States Patent [19]

Kurahashi et al.

[11] Patent Number: 6,003,325

[45] Date of Patent: Dec. 21, 1999

[54] AIR CONDITIONER PARTICULARLY SUITABLE FOR VEHICLE AND METHOD OF CONTROLLING THE SAME

[75] Inventors: Yasufumi Kurahashi, Otsu; Minoru Fukumoto, Nara, both of Japan

[73] Assignee: Matsushita Electric Industrial Co., Ltd., Osaka-Fu, Japan

[21] Appl. No.: 08/854,312

[22] Filed: May 12, 1997

[30] Foreign Application Priority Data

May 13, 1996 [JP] Japan .................................. 8-117621

[51] Int. Cl.$^6$ .............................. F25B 41/00; F25B 31/00
[52] U.S. Cl. .................................. 62/212; 62/225; 62/505
[58] Field of Search ........................... 62/212, 225, 505

[56] References Cited

U.S. PATENT DOCUMENTS 4,878,355  11/1989  Beckey et al. .......................... 62/505

*Primary Examiner*—William Wayner
*Attorney, Agent, or Firm*—Akin, Gump, Strauss, Hauer, & Feld, L.L.P.

[57] ABSTRACT

An air conditioner increases a flow rate of a refrigerant to be sucked to a compressor so that a superheat of the refrigerant is reduced when a coil temperature of a driving motor for a compressor is more than a predetermined temperature.

2 Claims, 5 Drawing Sheets

AIR CONDITIONER PARTICULARLY SUITABLE FOR VEHICLE AND METHOD OF CONTROLLING THE SAME

TITLE OF THE INVENTION

Air conditioner particularly suitable for vehicle and method of controlling the same

BACKGROUND OF THE INVENTION

The present invention relates to an air conditioner to be used with an electromobile or the like for air-conditioning an interior of its cabin space, and a method of controlling the same.

FIG. 3 is a block diagram showing the configuration of a conventional air conditioner. The air conditioner shown in FIG. 3 is a heat pump cooling, heating and dehumidifying apparatus mounted in an electromobile and used for air-conditioning a cabin space of an electromobile.

As shown in FIG. 3, a conventional air conditioner comprises an electric compressor 51, a first heat exchanger 52 for exchanging heat with the outside air, and second and third heat exchangers 53 and 54 for exchanging heat with the air blown into the cabin space. The electric compressor 51 and the first to the third heat exchangers 52 to 54 are connected by refrigerant pipes 55 through which a refrigerant such as freon is circulated. Between the first and the second heat exchangers 52 and 53, there is installed an electrically operated expansion valve 56 for restricting a flow rate of the refrigerant and thus causing the refrigerant to expand. More specifically, the electrical expansion valve 56 serves as a refrigerant choking device. The refrigerant pipes 55 are provided with a four-way valve 57 for switching an operation between a cooling operation and a heating operation. The refrigeration cycle consisting of compression, condensation, expansion, and evaporation is operated by a loop of the electric compressor 51, the first to third heat exchangers 52 to 54, and the electrical expansion valve 56 connected by the refrigerant pipes 55.

The electric compressor 51 is a sealed-type electric compressor, and contains a driving motor (not shown) and a coil temperature detector 51a for detecting the coil temperature of the driving motor. The driving motor is controlled and driven by an inverter 58.

The first heat exchanger 52 is installed outside the cabin space, and is cooled by a first blower 59 disposed in the vicinity thereof. The first heat exchanger 52 serves as a condenser during the cooling operation and as an evaporator during the heating operation.

The second heat exchanger 53 and the third heat exchanger 54 are both installed inside an air duct 60 through which air to be delivered to the cabin space is passed. The air duct 60 serves as an air passage connecting an air outlet 61a, through which air is blown into the cabin space, with a first air intake 61b, through which air is drawn from inside the cabin space, and a second air intake 61c, through which air is drawn from outside the cabin space. The air duct 60 is made up of a first air duct section 60a located in the upstream side of the air passage (hereinafter simply is referred to as upstream side) and communicating with the first and the second air intakes 61b and 61c, and second and third air duct sections 60b and 60c located in the downstream side of the air passage (hereinafter simply is referred to as downstream side) and communicating between the air outlet 61a and the first air duct section 60a. The second and the third air duct sections 60b and 60c are separated by a partition 60d on the upstream side and are merged together on the downstream side. In the first air duct section 60a, an intake damper 62 for regulating an intake air is disposed at the upstream end. A mix damper 63 is disposed at the downstream end of the first air duct section 60a. The intake damper 62 is operated by means of an intake air selector 68 mounted on an operation panel 67, to introduce air either from inside the cabin space, or from outside the cabin space, or their mixture, into the air duct 60. The mix damper 63 is driven by a mix actuator 63a and controls the amount of the air delivered to each of the second and the third air duct sections 60b and 60c, and thereby adjusts an outlet air temperature blown through the air outlet 61a.

The second heat exchanger 53 is located inside the first air duct section 60a between the intake damper 62 and the mix damper 63, and serves as the evaporator during the cooling operation and as the condenser during the heating operation. A second blower 64 for cooling the second heat exchanger 53 is disposed on the upstream side of the second heat exchanger 53. The second blower 64 is controlled by means of an air amount control 70 mounted on the operation panel 67. In order to change an air flow rate of the second blower 64 in accordance with a setting position on the air amount control 70, a resistance 65 for a driving motor of the second blower 64 is disposed on the downstream side of the second blower 64.

On the downstream side of the second heat exchanger 53 is installed an air temperature detector 66 for detecting the air temperature inside the first air duct section 60a. The air temperature detector 66 outputs the detected air temperature to first and second calculating blocks 73 and 74 contained in an air conditioner control unit 72 at a predetermined time interval (for example, every 10 seconds).

The third heat exchanger 54 is located inside the second air duct section 60b, and serves as the condenser during both the cooling and the heating operations. That is, air is warmed when passed through the third heat exchanger 54.

The operation panel 67 includes, in addition to the intake air selector 68 and the air amount control 70, a temperature control 69 using a variable resistance VR for making temperature setting corresponding to or associated with the outlet air temperature blown into the cabin space through the air outlet 61a, and an operation mode selector SW 71 for switching the refrigeration cycle between the cooling and the heating modes or stopping the operation.

The air conditioner control unit 72 includes an operation mode judging block 79 for judging the refrigeration cycle operation mode, the cooling or the heating, or operation stop, based on a first command signal from the operation mode selector SW 71 indicating the operation mode, and a target temperature calculating section 75 for calculating a target temperature of the second heat exchanger 53 based on a second command signal from the temperature control 69 indicating the set temperature. The air conditioner control unit 72 also includes the first calculating block 73 for calculating a temperature difference between the target temperature calculated by the target temperature calculating block 75 and the air temperature detected by the air temperature detector 66, the second calculating block 74 for calculating the change of the temperature detected by the air temperature detector 66 at the predetermined time interval, and a rotational speed correcting block 76 for calculating a correction value for a rotational speed of the electric compressor 51 based on the calculation result from the second calculating block 74.

The air conditioner control unit 72 further includes a rotational speed calculating block 77 for calculating the sum of a present rotational speed of the electric compressor 51 and the correction rotational speed calculated by the rotational speed correcting block 76 at the predetermined time interval, a coil temperature limiting block 80 for setting an upper limit on the rotational speed calculated by the rotational speed calculating block 77, and a rotational speed output block 81 for outputting a commanded rotational speed to the inverter 58 based on the rotational speed calculated by the coil temperature limiting block 80. Furthermore, the air conditioner control unit 72 includes a mix output block 78 for calculating an opening angle of the mix damper 63 based on the temperature setting on the temperature control 69 and for outputting a command signal to the mix actuator 63a, and an output control block 82 for switching the four-way valve 57 based on the result of the judgement by the operation mode judging block 79 and for controlling a valve opening of the electrical expansion valve 56.

Operation of the conventional air conditioner shown in FIG. 3 will be described below. For simplicity of explanation, the following description deals only with the operation of the conventional air conditioner in the cooling mode, and description of the heating mode operation is omitted.

When an operator such as a user desires cooling by cold air of 5 to 15° C., for example, the operator selects the cooling SW on the operation selector SW 71 and adjusts the desired temperature on the temperature control 69. As this is done, the operation mode judging block 79 judges that the cooling operation has been requested, and initiates the operation in the cooling mode. As a result, the output control block 82 outputs a switching signal to the four-way valve 57 to switch a refrigerant line in the refrigerant pipes 55 as shown by the solid lines in FIG. 3, while controlling the electrical expansion valve 56 to appropriate the valve opening.

On the other hand, the mix output block 78 controls the mix actuator 63a, for example, for full cold setting in FIG. 3. As a result, the mix damper 63 is moved to position A shown in FIG. 3 and held in that position.

Next, the operation of the conventional air conditioner will be described in detail with reference to FIG. 4.

FIG. 4 is a flowchart showing operation of the conventional air conditioner. The operation shown in FIG. 4 is performed at the predetermined time interval.

In the air conditioner control unit 72, the temperature adjusted on the temperature control 69 is input as Tset to the target temperature calculating block 75 (step 21).

Then, the air temperature detected by the air temperature detector 66 is input as Tm(n) to the first and the second calculating blocks 73 and 74 (step 22).

Next, the target temperature calculating block 75 calculates the target temperature Tmtrg of the second heat exchanger 53 based on the Tset (step 23). Next, the first calculating block 73 calculates the temperature difference TmSA between the Tmtrg and the Tm(n), and outputs it to the rotational speed correcting block 76 (step 24).

Then, the second calculating block 74 calculates the difference between the Tm(n) and the Tm(n−1), and outputs the difference to the rotational speed correcting block 76 as the change of the temperature TmHE during the predetermined time interval (step 25). Here, the Tm(n−1) is designated the detected temperature from the air temperature detector 66 for the previous interval period (one period back).

Next, the operation mode judging block 79 judges whether the requested operation mode is the cooling mode or the heating mode (step 26).

If the result of the judgement in step 26 shows the cooling mode, the rotational speed correcting block 76 outputs the amount of correction for the rotational speed, f1 (TmSA, TmHE), determined as a function of TmSA and TmHE, as Δf to the rotational speed calculating block 77 (step 27).

On the other hand, if the result of the judgement in step 26 shows the heating mode, the rotational speed correcting block 76 outputs the amount of correction for the rotational speed, f2 (TmSA, TmHE), determined as a function of TmSA and TmHE, as Δf to the rotational speed calculating block 77 (step 28).

Next, the rotational speed calculating block 77 calculates the sum of the Δf calculated in step 27 or 28 and the rotational speed f(n−1) calculated in the previous cycle of operation, and outputs the result as f(n) to the coil temperature limiting block 80 (step 29).

The coil temperature limiting block 80 sets an upper limit on the rotational speed calculated in step 29 in accordance with the coil temperature previously detected by the coil temperature detector 51a (step 30). The coil temperature limiting block 80 outputs the f(n) calculated and limited in step 30 to the inverter 58 via the rotational speed output block 81 (step 31).

Next, the second calculating block 74 and the rotational speed calculating block 77 store Tm(n) and f(n) as Tm(n−1) and f(nΔ1), respectively, for the next cycle of calculation (step 32).

In the above-mentioned conventional air conditioner, when the air-conditioning load is high and the coil temperature of the driving motor in the electric compressor 51 rises (for example, 120° C.), an upper limit is imposed on the rotational speed of the electric compressor in order to suppress the coil temperature rise of the driving motor. Thereby, when cooling power is really needed, the rotational speed of the electric compressor 51 is limited and the outlet air temperature blown into the cabin space rises. Limiting the cooling power in this way has had a problem in terms of comfort for an occupant in the cabin space.

To describe specifically, when the airconditioning load is high during the cooling operation (for example, temperature of an outside air is 30° C.) and the air is being drawn into the interior from outside the cabin space (fresh-air intake mode), the low side pressure (suction pressure) of the electric compressor 51 rises. This tends to cause a delivery pressure of the electric compressor 51 to rise. As a result, when the driving motor is contained inside the sealed-type electric compressor, the coil temperature of the driving motor increases with increasing the delivery pressure. Accordingly, based on the detection signal from the coil temperature detector 51a, the coil temperature limiting block 80 imposes an upper limit on the rotational speed calculated by the rotational speed calculating block 77, and the cooling power drops. For example, when the temperature detected by the coil temperature detector 51a is B shown in FIG. 5 (for example, 120° C.), the coil temperature limiting block 80 suppresses the coil temperature rise by controlling the limit value of the rotational speed to C shown in FIG. 5 (for example, 50 Hz).

On the other hand, when the heating load is high (for example, the temperature of the outside air is 15° C.) and the cabin space is sufficiently warm (for example, 30° C.), and when air is being drawn from inside the cabin space (inside air recirculation mode), the condition is such that the second heat exchanger 53 is difficult to discharge heat. As a result, the suction pressure of the electric compressor 51 rises. This tends to cause the delivery pressure of the electric compressor 51 to rise. Accordingly, as in the cooling mode operation, the coil temperature of the drive motor increases with increasing the delivery pressure. Thereby, based on the detection signal from the coil temperature detector 51a, the coil temperature limiting block 80 imposes an upper limit on the rotational speed calculated by the rotational speed calculating block 77, and the heating power drops.

BRIEF SUMMARY OF THE INVENTION

The object of the present invention is to provide an air conditioner which can solve the aforementioned problems.

In order to achieve the above-mentioned object, an air conditioner in accordance with the present invention comprises:

coil temperature detection means for detecting a coil temperature of a driving motor for a compressor, expansion means for expanding a refrigerant by restricting flow rate of the refrigerant to be sucked to said compressor, superheat detection means for detecting superheat of the refrigerant to be sucked to the compressor, a superheat control block for controlling the superheat in accordance with a first detection signal from the superheat detection means, and a coil temperature limiting block for controlling the superheat in accordance with a second detection signal from the coil temperature detection means.

In the air conditioner of the present invention, a superheat control block controls a superheat of a refrigerant to be sucked to the compressor in accordance with a first detection signal from a superheat detection means. Furthermore, a coil temperature limiting block controls the superheat in accordance with a second detection signal from a coil temperature detection means. Thereby, when the coil temperature is more than a predetermined temperature, it is possible to reduce the superheat. As a result, it is possible to drop a delivery pressure of the refrigerant, and thereby, to suppress the coil temperature rise without imposing an upper limit on the rotational speed of the compressor. Accordingly, even when the air-conditioning load is high, a cabin space comfort can be improved.

DETAILED DESCRIPTION OF THE INVENTION

A preferred embodiment of the present invention will be described with reference to accompanying drawings.

Figure 1:
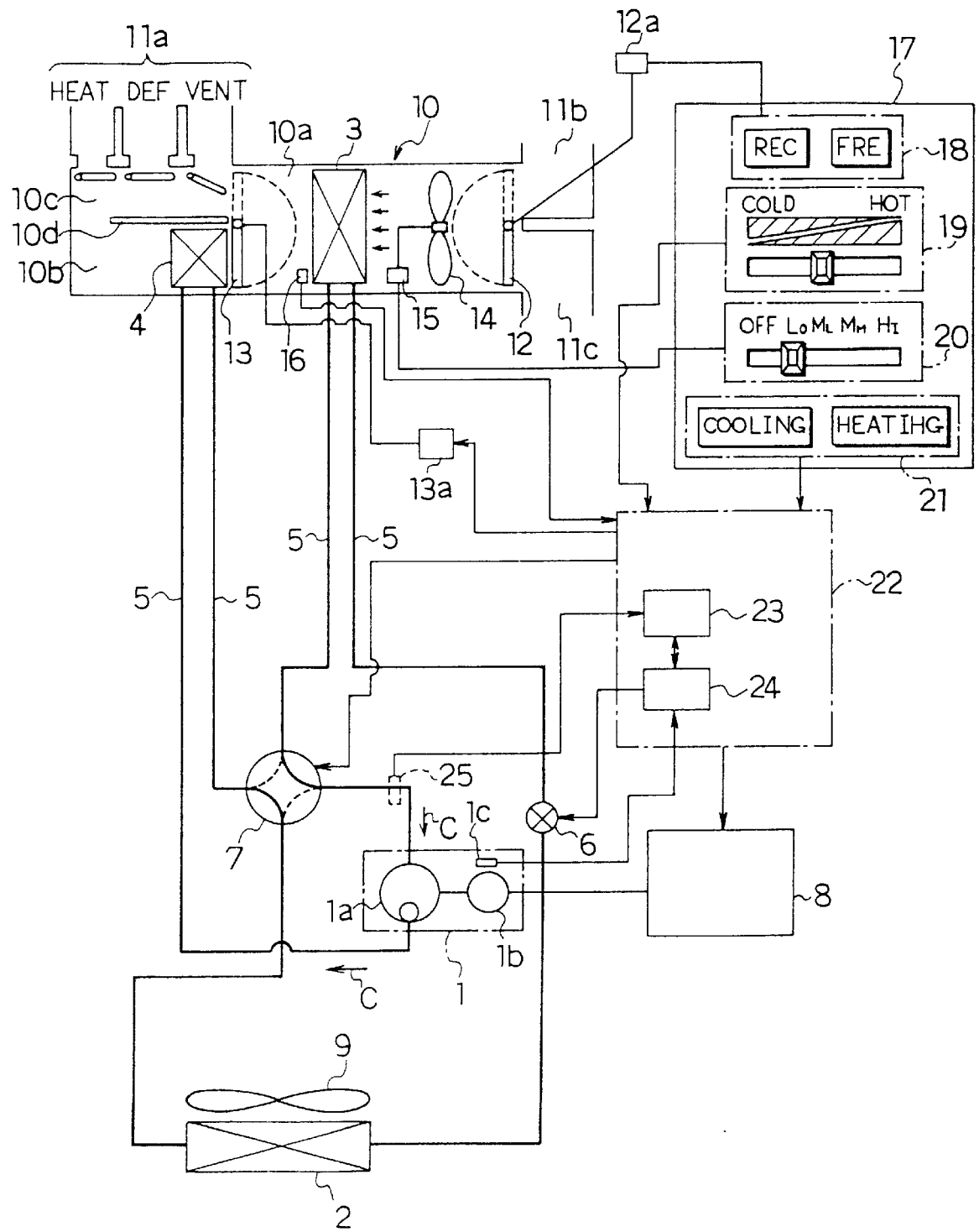
FIG. 1 is a block diagram showing the configuration of an air conditioner of the present invention.

FIG. 1 is a block diagram showing the configuration of an air conditioner of the present invention. To facilitate comparison with the conventional air conditioner, the following description assumes that the air conditioner is mounted in an electromobile and used to air-condition the interior of its cabin space.

As shown in FIG. 1, the air conditioner comprises a sealed-type electric compressor unit 1 containing therein a compressor 1a, a driving motor 1b for driving the compressor 1a, and a coil temperature detector 1c for detecting the coil temperature of the driving motor 1b; a first heat exchanger 2 for exchanging heat with an outside air; and second and third heat exchanger 3 and 4 for exchanging heat with an air blown into the cabin space. The electric compressor unit 1 and the first to the third heat exchangers 2 to 4 are connected by refrigerant pipes 5 through which a refrigerant such as freon is circulated. Thereby, the refrigerant passes through the refrigerant pipes 5 in a direction shown by an arrow C of FIG. 1. Between the first and the second heat exchangers 2 and 3, there is installed an electrically operated expansion valve 6 for restricting a flow rate of the refrigerant and thus causing the refrigerant to expand. More specifically, the electrical expansion valve 6 serves as a refrigerant choking device. Furthermore, for example, the electrical expansion valve 6 uses a type DVK-18D80 made by SAGINOMIYA SEISAKUSHO INC, Japan. The refrigerant pipes 5 are provided with a four-way valve 7 for switching the operation between a cooling operation and a heating operation. The refrigeration cycle consisting of compression, condensation, expansion, and evaporation is operated by a loop of the electric compressor unit 1, the first to the third heat exchangers 2 to 4, and the electric expansion valve 6 connected by the refrigerant pipes 5. The driving motor 1b is controlled and driven by an inverter 8. A superheat detector 25 for detecting superheat of a compressor suction side is provided between the four-way valve 7 and the electric compressor unit 1. This superheat detector 25 detects the superheat by detecting a refrigerant pressure and temperature inside the refrigerant pipes 5. The "superheat" of the compressor suction side is a temperature difference between a temperature of the refrigerant and a saturated temperature corresponding to the pressure value of the refrigerant.

The first heat exchanger 2 is mounted outside the cabin space, and is cooled by a first blower 9 disposed in the vicinity thereof. The first heat exchanger 2 serves as a condenser during the cooling operation and as an evaporator during the heating operation.

The second heat exchanger 3 and the third heat exchanger 4 are both installed inside an air duct 10 through which air to be delivered to the cabin space is passed. The air duct 10 serves as an air passage connecting an air outlet 11a, through which air is blown into the cabin space, with a first air intake 11b, through which air is drawn from inside the cabin space, and a second air intake 11c, through which air is drawn from the outside of the cabin space. The air duct 10 is made up of a first air duct section 10a located in the upstream side of the air passage and communicating with the first and the second air intakes 11b and 11c, and second and third air duct sections 10b and 10c located in the downstream side of the air passage and communicating between the air outlet 11a and the first air duct section 10a. The second and the third air duct sections 10b and 10c are partially separated by a partition 10d on the upstream side and are merged together on the downstream side. In the first air duct block 10a, an intake damper 12 for regulating the intake air is disposed at the upstream end, and a mix damper 13 is disposed at the downstream end. The intake damper 12 is operated by an intake actuator 12a which operates based on a command signal from an intake air selector 18 mounted on an operation panel 17, the intake damper 12 being actuated to introduce air either from inside the cabin space or from outside the cabin space, or their mixture, into the air duct 10. The mix damper 13 is driven by a mix actuator 13a and controls the amount of the air delivered to each of the second and the third air duct sections 10b and 10c, and thereby adjusts an outlet air temperature blown through the air outlet 11a.

The second heat exchanger 3 is located inside the first air duct block 10a between the intake damper 12 and the mix damper 13, and serves as the evaporator during the cooling operation and as the condenser during the heating operation. A second blower 14 for cooling the second heat exchanger 3 is disposed on the upstream side of the second heat exchanger 3 in the air passage. The second blower 14 is controlled by means of an air amount control 20 mounted on the operation panel 17. In order to change an air flow rate of the second blower 14 in accordance with a setting position on the air amount control 20, a resistance 15 for a driving motor of the second blower 14 is disposed on the downstream side of the second blower 14.

On the downstream side of the second heat exchanger 3 is installed an air temperature detector 16 for detecting an air temperature inside the first air duct block 10a. The air temperature detector 16 outputs the detected air temperature to an air conditioner controller 22 at a predetermined time interval (for example, every 10 seconds).

The third heat exchanger 4 is located inside the second air duct block 10b, and serves as the condenser during both the cooling and the heating operations. That is, air is warmed when passed through the third heat exchanger 4.

The operation panel 17 has the intake air selector 18 for operating the intake damper 12 via the intake air actuator 12a, a temperature control 19 using a variable resistance VR for making temperature setting corresponding to or associated with the outlet air temperature blown into the cabin space, the air amount control 20 constructed with a switch for setting the air flow rate of the second blower 14, and an operation mode selector SW 21 for switching the refrigeration cycle between the cooling and the heating modes or stopping the operation.

The air conditioner control unit 22 controls the air conditioner based on command signals from the operation panel 17, on the coil temperature detected by the coil temperature detector 1c, on the air temperature detected by the air temperature detector 16 and further on the superheat detected by the superheat detector 25. The air conditioner control unit 22 is configured with a superheat control block 23 for calculating the valve opening of the electrical expansion valve 6 so as to control and maintain optimum superheat in the refrigeration cycle on the basis of a first detection signal from the superheat detector 25 indicating the superheat, and a coil temperature limiting block 24 for controlling the final valve opening of the electrical expansion valve 6 based on a second detection signal from the coil temperature detector 1c indicating the coil temperature. The air conditioner control unit 22 is configured by a CPU or the like. The superheat control block 23 outputs a direction signal such as a pulse signal to the electrical expansion valve 6 via the coil temperature limiting block 24, so that the flow rate of the refrigerant at the electrical expansion valve 6 is controlled. When the coil temperature detected by the coil temperature detector 1c is more than a predetermined temperature, the coil temperature limiting block 24 corrects and outputs the direction signal from the superheat control block 23 to the electrical expansion valve 6 in order to reduce the superheat. Thereby, the flow rate of the refrigerant is increased, and the coil temperature is reduced. Further, when the coil temperature detected by the coil temperature detector 1c is more than the predetermined temperature, the superheat control block 23 stops to control the superheat. The predetermined temperature is adjusted to the coil temperature limiting block 24 previously.

Figure 2:
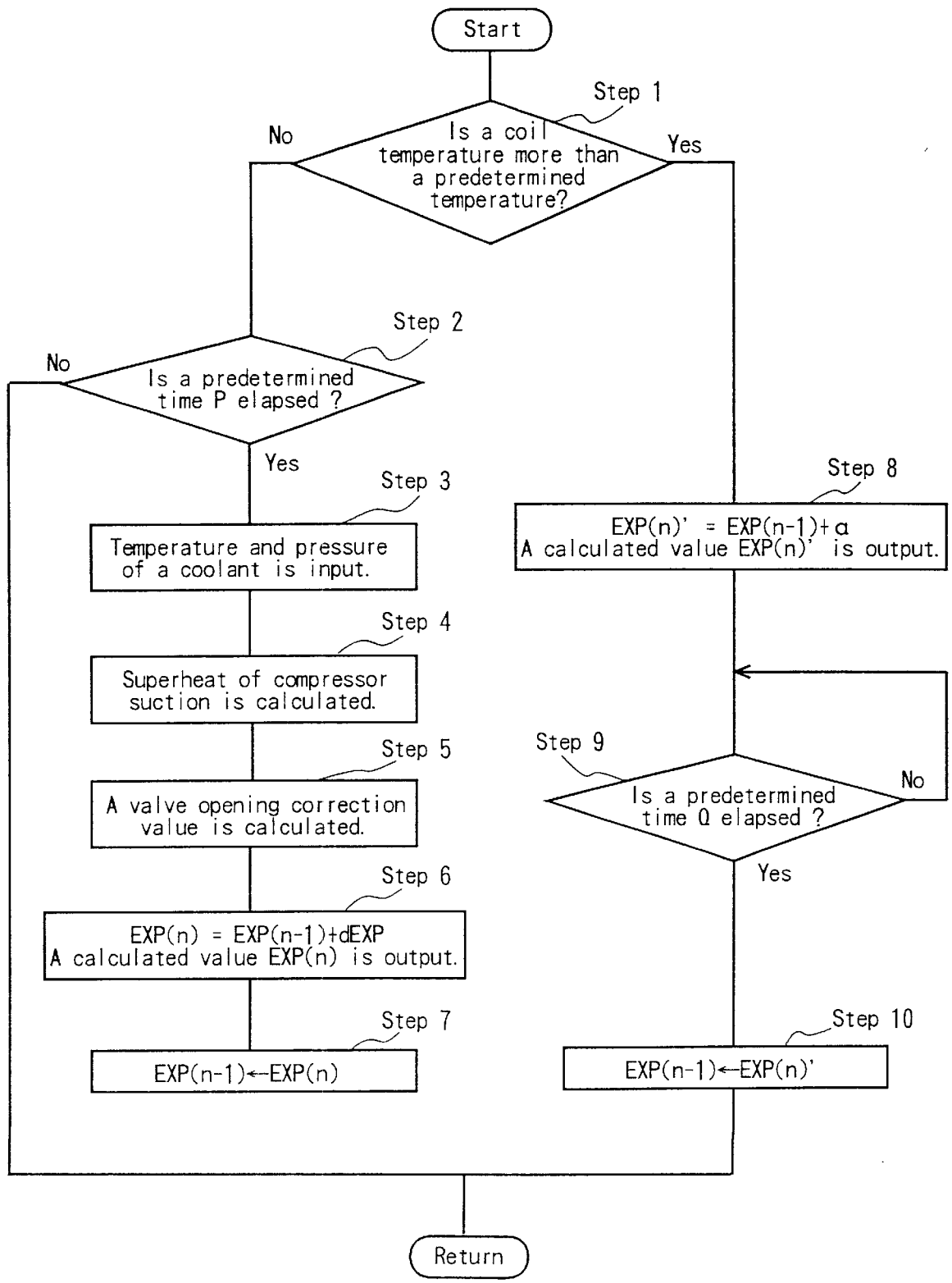
FIG. 2 is a flowchart showing operation of the air conditioner of FIG. 1.
Figure 3:
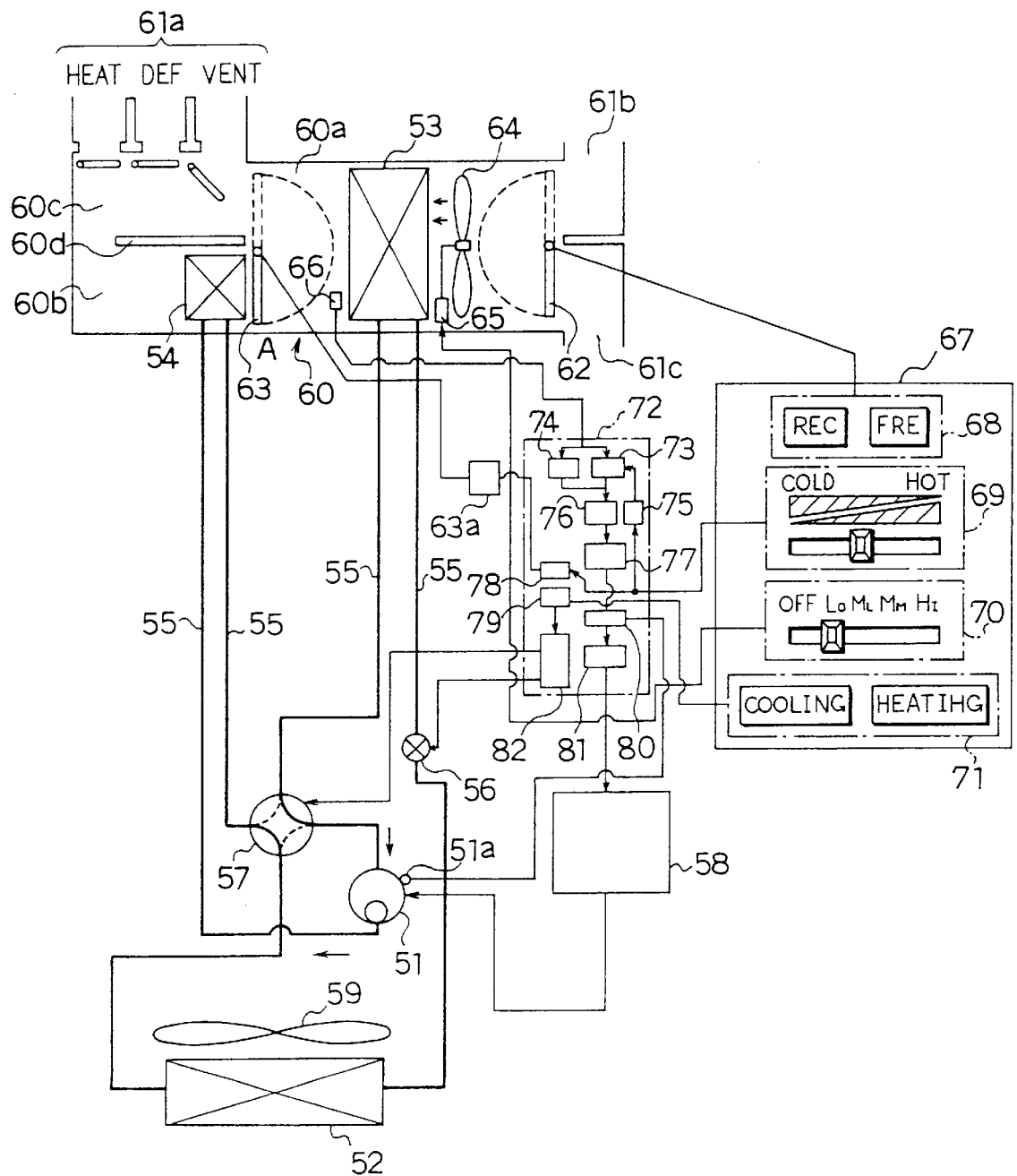
FIG. 3 is a block diagram showing the configuration of a conventional air conditioner.
Figure 4:
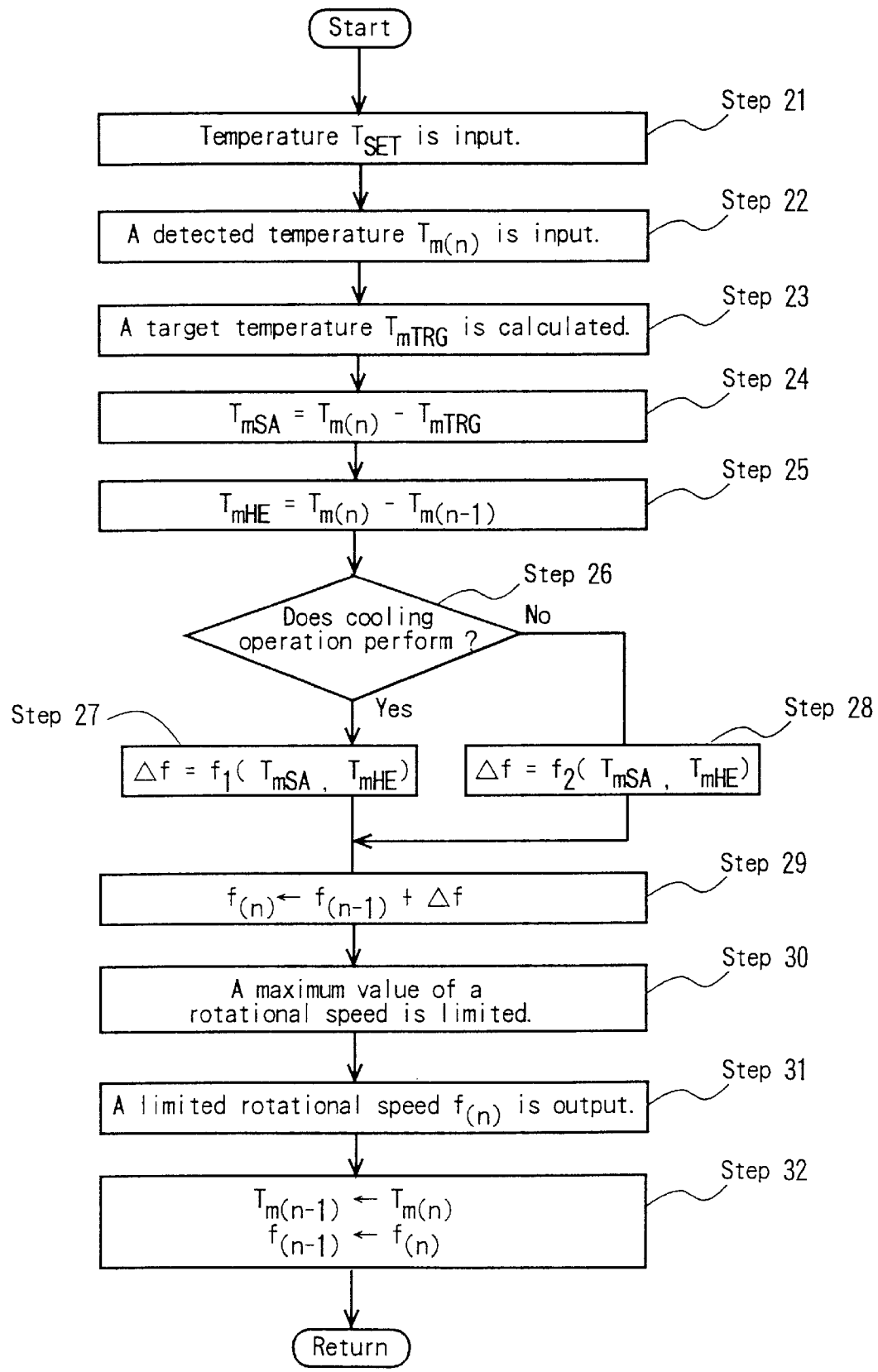
FIG. 4 is a flowchart showing operation of the air conditioner of FIG. 3.
Figure 5:
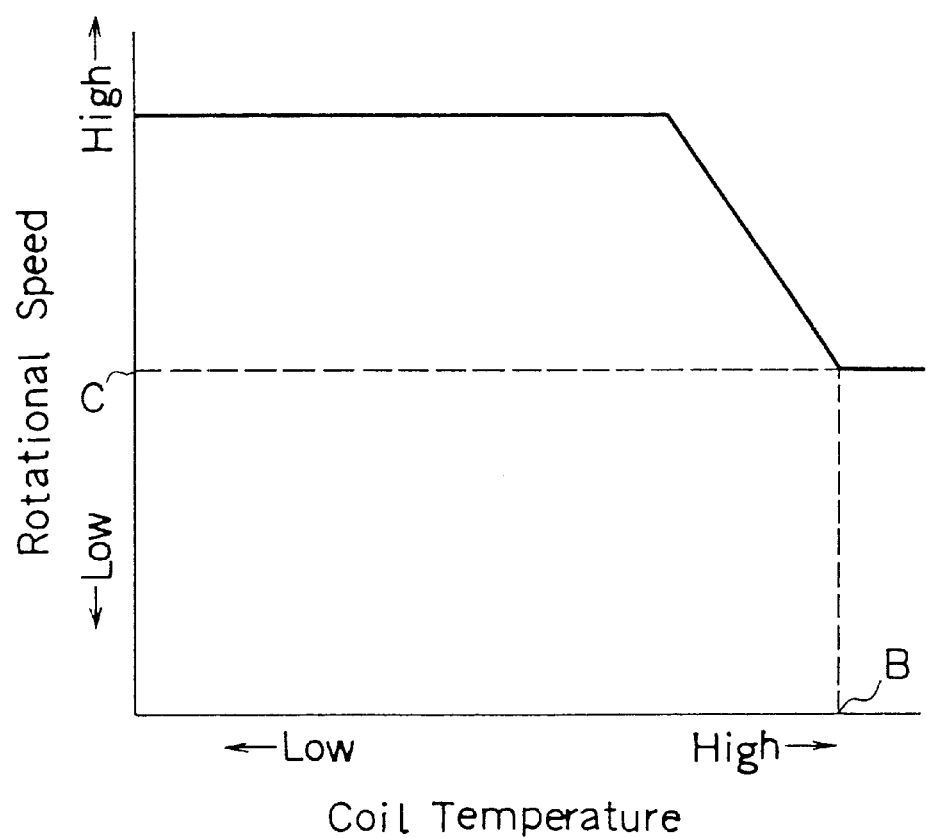
FIG. 5 is a graph showing the relationship (a limiting characteristic) between the detected coil temperature controlled by a coil temperature limiting block and the rotational speed of an electric compressor in the air conditioner of FIG. 3.

Operation of the air conditioner of the present invention will be described in detail with reference to FIG. 2, which is a flowchart showing an operation of the air conditioner shown in FIG. 1. It is assumed that the valve opening of the electrical expansion valve 6 is already adjusted to an initial value.

Firstly, the coil temperature limiting block 24 judges whether or not the coil temperature detected by the coil temperature detector 1c is more than the predetermined temperature (step 1).

If the result of the judgement in step 1 is "N", the superheat control block 23 judges whether a predetermined time P, for example, one minute, has elapsed (step 2). If the result of the judgement in step 2 is "N", RET (return) at the end of this flowchart is carried out.

If the result of the judgement in step 2 is "Y", the superheat control block 23 reads the detection signal from the superheat detector 25, namely, the refrigerant temperature and pressure (step 3), and calculates the superheat (step 4).

Next, the superheat control block 23 calculates a valve opening correction valve (dEXP) for the valve opening of the electrical expansion valve 6 by comparing the superheat calculated in step 4 with a target superheat (step 5). The target superheat is previously set to the superheat control block 23. Concretely, in the case of the cooling operation, the target superheat is set to 5 degrees, and in the case of the heating operation, the target superheat is set to 3 degrees.

Next, the superheat control block 23 calculates and outputs a control value (EXP(n)) to the electrical expansion valve 6 (step 6). The superheat control block 23 stores EXP(n) as EXP(n−1) for the next cycle of calculation (step 7).

On the other hand, if the result of the judgement in step 1 is "Y", the coil temperature limiting block 24 calculates and outputs a correction value as the above-mentioned direction signal so that the valve opening of the electrical expansion valve 6 is increased by a predetermined correction value α (for example, 10 pulses of the pulse signal) (step 8).

Next, the coil temperature limiting block 24 waits for a predetermined time Q (for example, two minutes) to elapse (step 9).

When the prescribed time (for example, two minutes) has elapsed, the coil temperature limiting block 24 stores EXP(n) as EXP(n−1) for the next cycle of calculation (step 10).

With the above configuration, in the air conditioner of the present embodiment, when the air-conditioning load is high, for example, the cooling load is high during the cooling operation, and the coil temperature of the driving motor 1b is of a high temperature (for example, 120° C.), the coil temperature limiting block 24 controls the electrical expansion valve 6 so as to increase a present valve opening by a predetermined correction value. Thereby, a flow rate per unit time of the refrigerant entering the compressor 1a increases. As a result, it is possible to drop a delivery pressure of the refrigerant, and thereby, to suppress the coil temperature rise without imposing an upper limit on the rotational speed of the electric compressor 1a. This alleviates the problem of the undesirable outlet air temperature rise in the air blown into the cabin space, so that the cabin space comfort can be improved.

In the above configuration, the detection signal indicating the temperature detected by the coil temperature detector 1c is directly output to the air conditioner control unit 22, but as an alternative, the temperature detection signal may be output via the inverter 8 to the air conditioner control unit 22.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. An air conditioner comprising:

coil temperature detection means for detecting a coil temperature of a driving motor for a compressor, an expansion valve for expanding a refrigerant by restricting flow rate of said refrigerant flowing to said compressor, superheat detection means for detecting superheating of said refrigerant flowing to said compressor, a superheat control block for controlling said superheating of said refrigerant in accordance with a first detection signal from said superheat detection means, a coil temperature limiting block for controlling said superheating of said refrigerant in accordance with a second detection signal from said coil temperature detection means, and said superheat control block stops controlling said superheating of said refrigerant while said coil temperature is greater than a predetermined temperature and said expansion valve is automatically controlled to increase the opening of the expansion valve by a predetermined correction value.

2. A method of controlling an air conditioner, said method comprising the steps of:

detecting a coil temperature of a driving motor for a compressor, detecting superheating of a refrigerant flowing to said compressor via an expansion valve, when said coil temperature is greater than a predetermined temperature, said superheating is reduced and a control for said superheating is stopped and said expansion valve is automatically controlled to increase the amount of an expansion valve opening by a predetermined correction value.

* * * * *